US008576445B2

(12) United States Patent
Mebane et al.

(10) Patent No.: US 8,576,445 B2
(45) Date of Patent: Nov. 5, 2013

(54) METHOD FOR PROCESSING HIGH DYNAMIC RANGE IMAGES USING TONE MAPPING TO EXTENDED RGB SPACE

(75) Inventors: Waleed H. Mebane, Belmont, CA (US); Bong sun Lee, Cupertino, CA (US); Wei Ming, Cupertino, CA (US); Jared Wayne Takeo Clock, Mountain View, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 13/171,370

(22) Filed: Jun. 28, 2011

(65) Prior Publication Data

US 2013/0003086 A1  Jan. 3, 2013

(51) Int. Cl.
*G06K 15/02* (2006.01)
(52) U.S. Cl.
USPC .......................................... 358/1.9; 382/167
(58) Field of Classification Search
USPC ......... 358/1.9, 2.1, 518, 3.16, 517, 515, 3.06, 358/519, 521, 530, 532, 3.27, 523; 382/162–167, 274, 275; 345/589–591, 345/600–604
See application file for complete search history.

(56) References Cited

U.S. PATENT DOCUMENTS

| 6,594,388 | B1 * | 7/2003 | Gindele et al. ................. 382/167 |
| 7,158,670 | B1 | 1/2007 | Fushiki et al. |
| 7,327,490 | B2 * | 2/2008 | Kuwata et al. .................. 358/1.9 |
| 7,843,605 | B2 * | 11/2010 | Shimbaru ....................... 358/1.9 |
| 2004/0190770 | A1 | 9/2004 | Spaulding et al. |
| 2005/0024652 | A1 | 2/2005 | Gondek |
| 2005/0024662 | A1 * | 2/2005 | Yamada .......................... 358/1.9 |
| 2005/0254076 | A1 * | 11/2005 | Mimamino ..................... 358/1.9 |
| 2007/0052719 | A1 | 3/2007 | Tin |
| 2007/0132866 | A1 | 6/2007 | Lee et al. |
| 2007/0236506 | A1 | 10/2007 | Tin |

FOREIGN PATENT DOCUMENTS

| EP | 1503576 | 2/2005 |
| EP | 1796372 | 6/2007 |
| WO | 01/17233 | 3/2001 |

OTHER PUBLICATIONS

Andre Gunther, RAW HDR Processing, Last update May 20, 2011, pp. 1-15 http://web.archive.org/web/20110520120125/http://www.aguntherphotography.com/tutorials/raw-hdr-processing.html.*
International Color Consortium scRGB definition 2003.*
International Color Consortium bg-sRGB definition 1999.*
Spaulding et al., "Optimized Extended Gamut Color Encoding for Scene-Referred and Output-Referred Image States", Journal of Imaging Science and Technology, Society for Imaging Science and Technology, vol. 45, No. 5, Sep. 1, 2001, pp. 418-426.

(Continued)

*Primary Examiner* — Barbara Reinier
(74) *Attorney, Agent, or Firm* — Chen Yoshimura LLP

(57) ABSTRACT

A method for processing a high dynamic range (HDR) image for printing. Tone mapping is first applied to the input image to map the colors from the original color space to an extended RGB space without scaling or clipping of colors. The colors are then converted to a device-independent color space such as Jab, and scaled (normalized) in that space. Then, image-based gamut mapping is performed in the Jab space to map the gamut of the image to the gamut of the destination device. The colors are then converted to the color space of the destination device (e.g. printer) and outputted.

10 Claims, 3 Drawing Sheets

(56) References Cited

OTHER PUBLICATIONS

Braun et al., "Gamut Mapping for Pictorial Images", Taga Proceedings, Jan. 1, 1999, pp. 645-660.

Morovic et al., "The Fundamentals of Gamut Mapping: A Survey", Journal of Imaging Science and Technology, Society for Imaging Science and Technology, vol. 45, No. 3, May 1, 2001, pp. 283-290.
European Search Report in counterpart application EP 12166141.7 dated Oct. 19, 2012.

* cited by examiner

METHOD FOR PROCESSING HIGH DYNAMIC RANGE IMAGES USING TONE MAPPING TO EXTENDED RGB SPACE

BACKGROUND OF THE INVENTION

1. Field of the Invention

This invention relates to a method for processing high dynamic range images for printing, and in particular, it relates to such a method using tone mapping and other processing steps.

2. Description of Related Art

A high dynamic range (HDR) image is an image with a high contrast between the maximum and minimum brightness colors, for example, up to 10000:1 or higher. Non-HDR images typically have smaller dynamic ranges, such as 1000:1, 256:1, or less, and are usually represented as 256 shades of red, green, and blue, or of cyan, magenta, and yellow, device primaries. An example of an HDR image is a digital photograph, although HDR images can be acquired in a variety of ways including computer generated images.

In order to print an HDR image by a printer (referred to as an output device), the image must first be rendered into colors supported by the printer. Typically, the range of colors that it is possible to produce on a printer, with ink or toner, is much smaller than the range that can be captured by a camera (referred to as the input device) which measures amounts of light. This is because of the limit of brightness available with ink or toner versus the brightness of light and the sensitivity of digital capture devices, such as digital cameras, to such light. During printing, the much greater range of colors captured by the input device must be fitted into the smaller range that it is possible to print. The process of fitting colors from the input device into the range and specific contours representing the color capabilities of the output device (referred to as the color gamut) is generally referred to as gamut mapping.

A special problem exists when the input range is extremely large compared the output range. If the straightforward approach of simply scaling the input values to within the smaller range is attempted, many colors will become too dim to be seen, after scaling, and much of the subtle gradations between colors would also be lost. Another possible approach is clipping of out-of-range colors or a combination of clipping of extreme colors and scaling of less extreme colors. For some high dynamic range images, the clipping of some mid-range colors would result in problematic renderings that appear unrealistic, and the clipping of high-range colors may require more time to process.

A more sophisticated approach commonly referred to as "tone mapping" can be employed. Tone mapping generally refers to an image processing technique to map one set of colors to another in order to approximate the appearance of HDR images in a medium that has a more limited dynamic range. Many known tone mapping algorithms have been described. One particular example is an algorithm known as iCAM06, described in "iCAM06: A refined image appearance model for HDR image rendering," J. Kuang et al., J. Vis. Commun. Image R. 18 (2007) 406-414. In this algorithm, colors are tone mapped to roughly within the range of an intermediate destination device, and then scaled and clipped to the specific contours representing the color capabilities of the output device. However, the process of scaling and clipping can suffer from similar problems as noted above (the problems would just be limited to a smaller set of colors).

Windows Color System (WCS) is a color management scheme used on Windows Vista™ and later operating systems. To print an HDR image from a computer that uses WCS, a conventional approach is to first tone-map the HDR image into the sRGB color space, and then use the normal WCS color gamut map model (GMM) to print the image.

SUMMARY

A problem of the convention printing method using WCS described above is the possible negative RGB value generating during the process. Further, the method sometimes results in the printer gamut not being fully utilized.

Accordingly, the present invention is directed to a method for processing HDR images for printing that substantially obviates one or more of the problems due to limitations and disadvantages of the related art.

An object of the present invention is to provide a process for printing HDR images that achieves high color accuracy and efficient use of the color capabilities of the printer.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a computer implemented method for processing an input high dynamic range (HDR) image to generate an output image to be output by an output device, the method including: (a) mapping colors of the input HDR image from a first color space to a second color space using a tone-mapping filter, the second color space being an extended RGB color space; (b) converting the colors of the image from the second color space to a third color space, the third color space being a device independent color space; (c) scaling the colors of the image in the third color space; (d) generating a gamut mapping which maps a gamut of the image in the third color space after they have been scaled in step (c) to a gamut of the output device; and (e) converting the colors of the image, after they have been scaled in step (c), from the third color space to a fourth color space using the gamut mapping generated in step (d), to generate an output image.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention may be implemented by software stored in a storage medium and executed by a processor of a data processing apparatus. Preferably, it is implemented as a part of a printer driver program stored and executed on a computer connected to a printer. The invention is useful in computers that use the WCS color management scheme; it may also be useful in computers that use another color management scheme that has similar characteristics as WCS in pertinent aspects as will be understood from the descriptions in this disclosure.

In an image processing method according to embodiments of the present invention, the input image is tone-mapped into an extended RGB space without clipping or scaling. The colors are then converted to a device-independent color space such as Jab, and scaled (normalized) in that space. Then, image-based gamut mapping is performed to map the gamut of the image from the Jab space to the gamut of the destination device.

The image processing method may be applied to HDR images obtained by digital cameras, computer graphics software, etc. The output device may be a printer, a computer monitor, a projector, etc.

Figure 1:
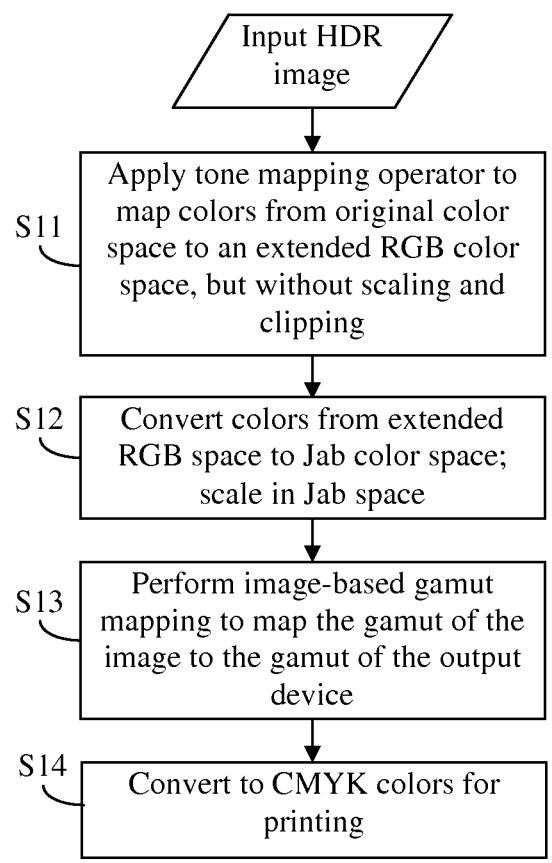
FIG. 1 schematically illustrates an image processing method for high dynamic range images according to an embodiment of the present invention.

FIG. 1 illustrates a method according to an embodiment of the present invention for processing an HDR image for printing by a printer. First, a tone mapping operator is applied to the input image data to tone-map the input colors to an extended RGB color space, but without scaling and clipping of colors (step S11).

As commonly used in the field, the term "tone mapping operator" refers to a tone mapping algorithm, which includes a mapping of colors using tone mapping filters, and typically also includes subsequent steps such as scaling, clipping, etc. For example, in the iCAM06 algorithm, after the color values are mapped using filters, the algorithm finds a maximum value for which 99% of all colors in the image are equally bright or less bright (i.e. the 99th percentile), and a minimum value for which 1% of all colors in the image at equally bright or less bright (i.e., the 1st percentile). The algorithm removes the colors outside of the range defined by the maximum and minimum values (i.e. clipping), and scales the colors between the maximum and minimum brightness values to fill the space of sRGB (i.e. scaling or normalization).

The tone mapping of step S11 maps the input colors using a tone-mapping operator, but does not include a scaling or a clipping step. In a preferred embodiment, a modified iCAM06 algorithm is used as a tone mapping operator in step S11, where the scaling and clipping steps of the iCAM06 algorithm are not performed. The color space of the tone-mapped colors resulting from step S11 is an RGB space, and is referred to as the "extended RGB space" in this disclosure. All color values mapped from the input colors in step S11 are preserved in the extended RGB space. Preferably, the colors are not converted to the sRGB format. In an alternative embodiment, the colors are converted to the sRGB format; but even in the alternative embodiment, all colors are preserved, so the converted colors may be considered to form an extended sRGB space.

In a preferred embodiment, step S11 is implemented by modifying a program that implements iCAM06. The program may be further modified to change the iCAM06 tone-mapping filters. Although details of the iCAM06 algorithm are not described here, based on the descriptions given here and publicly available documentations of iCAM06, those skilled in the art will be able to implement step S11 without undue experimentation.

Other suitable tone mapping algorithms, such as Reinhard02, Durand02 and Tumblin/Rushmeier, may also be used to implement step S11.

Then, the tone-mapped colors in the extended RGB space are scaled (normalized) in a device independent color space, such as Jab, CIE L*a*b* or CIE L*u*v*. Jab, used in the explanation below, is a color space defined in CIECAM02 specification, which is used in WCS. Scaling from the extended RGB space to the Jab space is done by first converting the RGB colors to the Jab space, and then scaled in the Jab space (step S12).

Figure 2A:
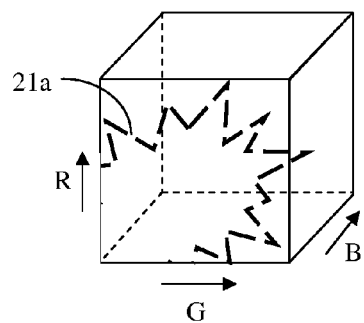
FIGS. 2(a) to 2(d) schematically illustrates colors of the input image after various processing steps in the method of FIG. 1.
Figure 2B:
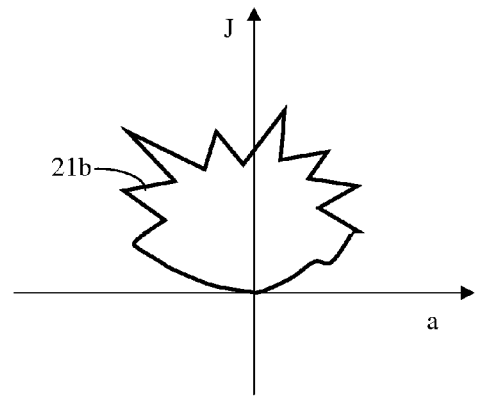

FIG. 2(a) schematically shows a gamut 21a of the HDR image, i.e., the collection of all colors in the HDR image after the colors have been tone-mapped in the RGB space (but not scaled or clipped) in step S11, in an RGB space. An RGB cube is also depicted to provide a reference, although it should be noted that in the extended RGB space, the color values do not have any practical limit. In an RGB space, black, gray and white colors are located on the neutral axis R=G=B. When the RGB colors are converted to the Jab space, as shown in FIG. 2(b), the RGB cube becomes approximately a diamond shape (not shown), but the yellow side is higher and the blue side is lower. The neutral axis is along the J axis. FIG. 2(b) schematically shows the HDR image gamut 21b after the colors are converted to the Jab space as a part of step S12.

Figure 2C:
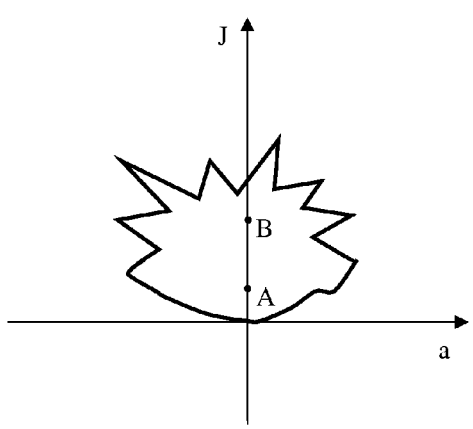

Scaling in the Jab space is performed as follows. First, the algorithm finds a first J value (referred to as $J_{01}$) for which 1% of all colors in the HDR image gamut 21b have equal or lower J values, a second J value (referred to as $J_{99}$) for which 99% of all colors in the HDR image gamut have equal or lower J values. The $J_{01}$ and $J_{99}$ values (a=b=0) are indicated as points A and B, respectively, in FIG. 2(c). It is noted that the values $J_{01}$ and $J_{99}$ are often fairly close to each other on the J axis, and fairly far away from J=0 and the maximum J value of the HDR image gamut. This reflects the fact that the colors are often very densely packed in the mid-range between $J_{01}$ and $J_{99}$ and sparsely represented above and below that range.

Figure 2D:
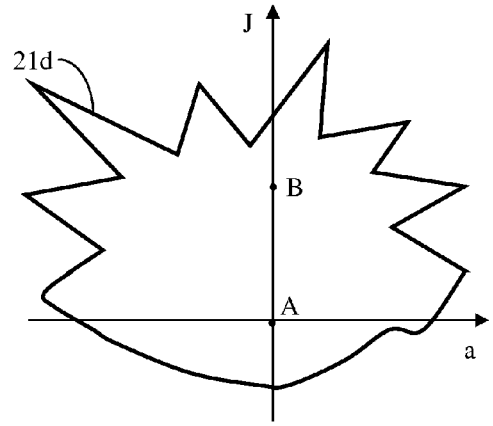

Then, the HDR image gamut 21b is shifted in the J direction and expanded or contracted uniformly in all directions so that after the operations, the $J_{01}$ point is placed at a first normalized J value $J_{norm1}$, and the $J_{99}$ point is placed at a second normalized J value $J_{norm2}$. In a preferred embodiment, the first normalized value $J_{norm1}$ is at the origin of the Jab space. FIG. 2(d) shows the shifted and expanded/contracted HDR image gamut 21d with $J_{norm1}$=0. It can be seen that in this example, after these operations, the HDR image gamut 21d has portions with negative J values.

The relationship between the color values J', a' and b' after the scaling (shifting and expansion/contraction) and the color values J, a and b before it is:

$$J'=(J-J_{01})*K$$

$$a'=a*K$$

$$b'=b*K$$

where $$K=(J_{norm2}-J_{norm1})/(J_{99}-J_{01})$$

is the scaling factor. If the $J_{01}$ and $J_{99}$ points are very close to each other, the scaling factor may be very large. In a preferred embodiment, $J_{norm2}$ and $J_{norm1}$ are the luminance values for white and black, respectively, which may have values of, for example, 100 and 0, respectively. In another preferred embodiment, $J_{norm2}$ is approximately the brightness value of a typical medium such as paper, e.g. 80, and $J_{norm1}$ is approximately the brightness value of black ink or toner printed on paper, e.g. 10. Other values may be used as well.

One significant effect of the above scaling algorithm is to fix the reference white and black. Scaling in this way makes the color at the 99th percentile and 1st percentile become white and black, respectively. For most images tone-mapped using iCAM06, the scaling factor is greater than 1. The conceptual meaning of making the gamut uniformly larger in every direction is to increase lightness (or darkness) and to increase saturation.

The scaled HDR image gamut 21d does not necessarily fill up an RGB (or CMYK) device gamut (e.g. printer gamut) in the Jab space. This is because the shape of the scaled HDR image gamut depends on the colors in the image.

As compared to performing scaling in the sRGB space, as is done in iCAM06, performing scaling in the perceptually uniform Jab space can put the color brightness in a more appropriate place. The resulting colors are more saturated. Negative color values may still occur, but their meaning is more obvious in the Jab space (whereas negative sRGB values do not necessarily have an obvious meaning).

Although the percentile values 1% and 99% are used to define the first and second J values in the above example, other percentile values may be used for this purpose, such as 2% and 98%, etc.

Then, image-based gamut mapping is performed to map the gamut of the image resulting from step S12 (in the Jab space) to the gamut of the output device (step S13). In the WCS color gamut map model (GMM), the gamut of a source device (source gamut) is mapped to the gamut of a destination device (destination gamut). Both the source gamut and the destination gamut are device-dependent, i.e., they are characteristic of the color capabilities of the source and destination devices, but are not image-dependent, i.e., they are not specific to the color gamut of the individual images being processed. To the contrary, in step S13, the gamut mapping is image-based, i.e., the color gamut of the image being processed is mapped to the destination gamut. The color gamut of the image can sometimes be smaller than the source gamut used in the WCS GMM. Thus, by using image-based gamut mapping, the destination gamut can be more fully utilized.

The image-based gamut mapping step S13 may include clipping (i.e. moving points to the surface of the destination gamut), scaling (i.e. scaling the colors to within the destination gamut), or a combination of clipping and scaling. A preferred implementation of step S13 is described with reference to FIG. 3.

Figure 3:
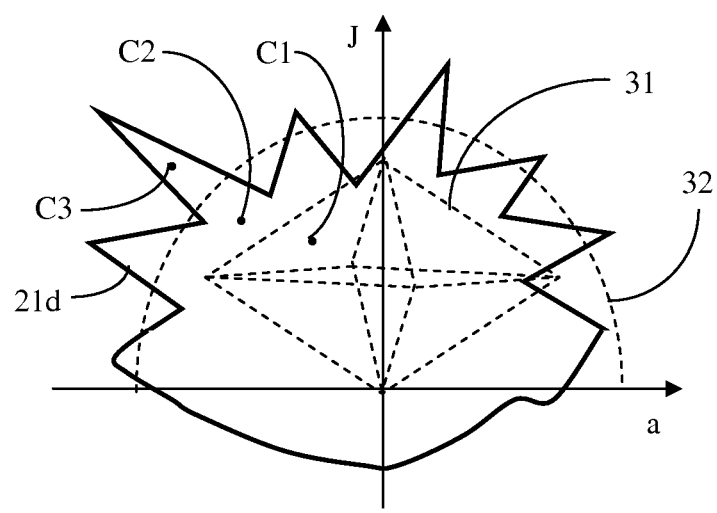
FIG. 3 schematically illustrates the image based gamut mapping step in the method of FIG. 1.

As schematically shown in FIG. 3, the HDR image gamut 21d, generated by the scaling step 12, is mapped to the destination gamut 31. The colors in the HDR image gamut 21d fall into three categories which are treated differently. First, colors that are within the destination gamut (e.g. point C1) are compressed (i.e. scaled down). Second, colors that are outside of the destination gamut but within a predefined boundary 32 (e.g. point C2) are compressed to within the destination gamut 31. Generally, colors in the second category are compressed by greater amounts than colors in the first category, and the compression factors for the first and second categories of colors affect each other. In some embodiments, the colors in the second category are compressed into a relatively small space so as to either make them appear more saturated, or so that the other colors are not compressed too much, or to achieve a combination of those goals. Third, extreme outlying colors located outside of the boundary 32 (e.g. point C3) are mapped to the surface of the destination gamut 31. The third category of colors do not affect the compression factors of the first and second categories of colors.

Alternative gamut mapping algorithms, including those that divide the colors into two categories, may be used.

In the image based gamut mapping step S13, each hue may be compressed by different amounts. This is because for a given image, certain hues may exhibit larger dynamic ranges than other hues. While conventional gamut mapping algorithm may also compress different hues by different amounts, the differences in compression amounts in image-based gamut mapping may be to a greater extent than for conventional gamut mapping due to the possible large differences in dynamic ranges for different hues.

Thereafter, using the gamut mapping generated by step S13, the scaled colors of the image (i.e. the colors generated by the scaling step S12) are converted to the color space of the output device for output (step S14). For example, if the output device is a printer, step S14 will convert the colors to CMYK.

Steps S12, S13 and S14 may be implemented in the WCS framework as follows. The processing in steps S12 and S13 may be implemented in a plugin software module. First, the WCS Gamut Mapping Model Profile (GMMP) file is created or modified so that it contains a plugin tag for the plugin module. The tag contains the globally-unique identifier (GUID) of the plugin (which is embedded in its DLL, and registered in the Windows Registry). Then get handles to the profiles to be used in the color conversion, using calls to OpenColorProfile( ) or WcsOpenColorProfile( ) functions. Then call CreateMultiProfileTransform( ). For optimized transforms, this initiates the image-based gamut mapping step (the plugin will be called because of the tag in the profile) . For sequential transforms, most of the work is deferred (by WCS) until the next step. Then call TranslateColors( ) or TranslateBitmapBits( ), passing the colors from the image which are to be converted. For optimized transforms, WCS uses its internal LUT, created in the previous step, to estimate the conversion color. For sequential transforms, WCS sends each color through all of the steps of the WCS pipeline which will include the image-based gamut mapping plugin since its GUID was requested in the GMMP profile for this transform. The above implementation is only an example, and other implementations are possible, including those that do not use the WCS functions.

It will be apparent to those skilled in the art that various modification and variations can be made in the HDR image processing method of the present invention without departing from the spirit or scope of the invention. Thus, it is intended that the present invention cover modifications and variations that come within the scope of the appended claims and their equivalents.

What is claimed is:

1. A computer implemented method for processing an input high dynamic range (HDR) image to generate an output image to be output by an output device, the method comprising:

(a) mapping colors of the input HDR image from a first color space to a second color space using a tone-mapping filter, the second color space being an extended RGB color space;

(b) converting the colors of the image from the second color space to a third color space, the third color space being a device independent color space;

(c) scaling the colors of the image in the third color space, including:

determining first and second brightness values, for which a respective first and second predetermined percentages of all colors in the HDR image have equal or lower brightness values; and shifting the colors along a brightness axis and expanding or contracting the colors uniformly in all directions in the third color space to place the first brightness value at a first normalized brightness value and to place the second brightness value at a second normalized brightness value;

(d) generating a gamut mapping which maps a gamut of the image in the third color space after they have been scaled in step (c) to a gamut of the output device; and (e) converting the colors of the image, after they have been scaled in step (c), from the third color space to a fourth color space using the gamut mapping generated in step (d), to generate an output image.

2. The method of claim 1, wherein the first normalized brightness value is zero.

3. The method of claim 1, wherein the first and second predetermined percentages are 1% and 99%, respectively.

4. The method of claim 1, wherein the third color space is Jab.

5. The method of claim 1, wherein the fourth color space is CMYK and the output device is a printer.

6. A computer program product comprising a computer usable non-transitory medium having a computer readable program code embedded therein for controlling a data processing apparatus, the computer readable program code configured to cause the data processing apparatus to execute a process for processing an input high dynamic range (HDR) image to generate an output image to be output to an output device, the process comprising:

(a) mapping colors of the input HDR image from a first color space to a second color space using a tone-mapping filter, the second color space being an extended RGB color space;

(b) converting the colors of the image from the second color space to a third color space, the third color space being a device independent color space;

(c) scaling the colors of the image in the third color space, including:
  determining first and second brightness values, for which a respective first and second predetermined percentages of all colors in the HDR image have equal or lower brightness values; and
  shifting the colors along a brightness axis and expanding or contracting the colors uniformly in all directions in the third color space to place the first brightness value at a first normalized brightness value and to place the second brightness value at a second normalized brightness value;

(d) generating a gamut mapping which maps a gamut of the image in the third color space after they have been scaled in step (c) to a gamut of the output device; and (e) converting the colors of the image, after they have been scaled in step (c), from the third color space to a fourth color space using the gamut mapping generated in step (d), to generate an output image.

7. The computer program product of claim 6, wherein the first normalized brightness value is zero.

8. The computer program product of claim 6, wherein the first and second predetermined percentages are 1% and 99%, respectively.

9. The computer program product of claim 6, wherein the third color space is Jab.

10. The computer program product of claim 6, wherein the fourth color space is CMYK and the output device is a printer.

* * * * *